US008671207B2

(12) United States Patent
Fukuda

(10) Patent No.: US 8,671,207 B2
(45) Date of Patent: Mar. 11, 2014

(54) COMMUNICATION NETWORK SYSTEM

(75) Inventor: Naohiro Fukuda, Funabashi (JP)

(73) Assignee: Panasonic Corporation, Osaka (JP)

( * ) Notice: Subject to any disclaimer, the term of this patent is extended or adjusted under 35 U.S.C. 154(b) by 362 days.

(21) Appl. No.: 13/133,997

(22) PCT Filed: Dec. 11, 2009

(86) PCT No.: PCT/JP2009/070754
§ 371 (c)(1),
(2), (4) Date: Jun. 10, 2011

(87) PCT Pub. No.: WO2010/067864
PCT Pub. Date: Jun. 17, 2010

(65) Prior Publication Data
US 2011/0320621 A1    Dec. 29, 2011

(30) Foreign Application Priority Data
Dec. 12, 2008    (JP) ................... 2008-317440

(51) Int. Cl.
G06F 15/16        (2006.01)
G06F 15/173       (2006.01)

(52) U.S. Cl.
USPC .......................... 709/229; 709/225

(58) Field of Classification Search
None
See application file for complete search history.

(56) References Cited

U.S. PATENT DOCUMENTS 7,688,981 B2 *   3/2010   Halasz et al. ............ 380/278
8,201,221 B2 *   6/2012   Kitani et al. ............. 726/4
8,407,462 B2 *   3/2013   Xie et al. ................. 713/153

2005/0120090 A1   6/2005   Kamiya
2005/0125692 A1 * 6/2005   Cox et al. ................ 713/201
2007/0011262 A1   1/2007   Kitani et al.

FOREIGN PATENT DOCUMENTS

JP    2005-184792 A    7/2005
JP    2007-5847 A      1/2007
JP    2008-48055 A     2/2008

OTHER PUBLICATIONS

International Search Report for the Application No. PCT/JP2009/070754 mailed Mar. 23, 2010.

* cited by examiner

Primary Examiner — John B. Walsh
(74) Attorney, Agent, or Firm — Renner, Otto, Boisselle & Sklar, LLP

(57) ABSTRACT

The communication network system comprises: a relay device (40) interposed between nodes (30); and a setting device (50) connected to the relay device (40). The relay device (40) comprises: a relay unit (401) configured to relay between the nodes (30); and a routing unit (403) configured to control the relay unit (401) in accordance with the partition information stored in the partition information storage unit (402). The setting device (50) comprises: a broker information storage unit (502) configured to store the broker information received by the communication unit (501); a broker information setting unit (503) configured to generate the partition information based on the broker information stored in the broker information storage unit (502); and a partition information update unit (504) configured to update the partition information stored in the partition information storage unit (402) to the partition information generated by the broker information setting unit (503).

10 Claims, 3 Drawing Sheets

FIG. 5

| source node ID | domain ID | request node ID | attribute | --- |

COMMUNICATION NETWORK SYSTEM

TECHNICAL FIELD

The present invention relates to communication network systems, and particularly to a communication network system including plural nodes and a relay device configured to enable communication between the nodes.

BACKGROUND ART

Document 1 (JP 2007-5847 A) discloses a network which includes a network relay device configured to connect a terminal to a shared device by way of a link. The network relay device judges whether or not transmission of data between nodes is allowed, on the basis of conditions concerning at least one of a source node and destination node of the data.

However, the network disclosed in document 1 cannot perform dynamic access control of prohibiting communication between nodes normally and of allowing the communication between the nodes if necessary.

DISCLOSURE OF INVENTION

In view of the above insufficiency, the present invention has been aimed to propose a communication network system capable of performing dynamic access control between nodes.

The communication network system in accordance with the present invention comprises: plural nodes; a relay device interposed between the nodes; and a setting device connected to the relay device. The relay device comprises: a relay unit configured to relay between the nodes; a partition information storage unit configured to store partition information for indicating whether or not the relay unit relays between the nodes; and a routing unit configured to control the relay unit in accordance with the partition information stored in the partition information storage unit. The setting device comprises: a reception unit configured to receive broker information indicative of a request of relaying between the nodes; a broker information storage unit configured to store the broker information received by the reception unit; a broker information setting unit configured to generate the partition information based on the broker information stored in the broker information storage unit; and a partition information update unit configured to update the partition information stored in the partition information storage unit of the relay device to the partition information generated by the broker information setting unit.

According to this communication network system, when the broker information is transmitted to the setting device, the partition information storage unit of the relay device is enabled to modify the partition information. Therefore, a control (access control) can be dynamically made to permit or prohibit the communication between the nodes.

In a preferred embodiment, the broker information includes information indicative of a source and information indicative of a destination. The source is defined as the node which requests the relay device to relay a signal. The destination is defined as the node which the source requests to receive the signal. The broker information setting unit comprises: a broker information judgment module configured to, when the broker information storage unit stores two pieces of the broker information including first broker information and second broker information, judge whether or not the source and the destination indicated by the first broker information are identical to the destination and the source indicated by the second broker information respectively; and a partition information generation module configured to generate the partition information for making the relay device relay between the source indicated by the first broker information and the destination indicated by the first broker information when the broker information judgment module determines that the source and the destination indicated by the first broker information are identical to the destination and the source indicated by the second broker information respectively.

According to this communication network system, it is possible to reduce the possibility that a third person eavesdrops on the communication.

In a preferred embodiment, each of the nodes includes an object defined as a group of interfaces each being a program for realizing a desired function. The partition information includes an object identifier for identifying the object, and an interface identifier for identifying the interface.

According to this communication network system, with using only one piece of the identification information for identifying the node, it is possible to define the partition information for the plural object. In other words, it is possible to request the plural services, with using only one of the plural object identifiers. For example, when the communication network protocol is the TCP/IP, a service provider can provide a large number of services only with less number of the connections, and the service receiver can receive a large number of services only with the less number of the connections.

The other communication network system in accordance with the present invention comprises: an upper domain including plural lower domains. Each of the lower domains comprises plural nodes and a lower relay device interposed between the nodes. The lower relay device comprises: a lower relay unit configured to relay between the nodes; a lower partition information storage unit configured to store lower partition information for indicating whether or not the lower relay unit relays between the nodes; and a lower routing unit configured to control the lower relay unit in accordance with the lower partition information stored in the lower partition information storage unit. The upper domain further comprises an upper relay device interposed between the lower relay devices belonging to the different lower domains, and an upper setting device connected to the upper relay device. The upper relay device comprises: an upper relay unit configured to relay between the lower relay units; an upper partition information storage unit configured to store upper partition information for indicating whether or not the upper relay unit relays between the lower relay units; and an upper routing unit configured to control the upper relay unit in accordance with the upper partition information stored in the upper partition information storage unit. The upper setting device comprises: an upper reception unit configured to receive upper broker information indicative of a request of relaying between the lower relay units; an upper broker information storage unit configured to store the upper broker information received by the upper reception unit; an upper broker information setting unit configured to generate the upper partition information based on the upper broker information stored in the upper broker information storage unit; and an upper partition information update unit configured to update the upper partition information stored in the upper partition information storage unit to the upper partition information generated by the upper broker information setting unit.

According to this communication network system, it is possible to dynamically determine whether the communication between the lower domains is permitted or prohibited. Further, because of the domain hierarchy, each associated node in the domain is only required to have the identification information (address) that can be discriminated from the other node in that domain. Thus, it is allowed to use the closed address distinctive only within the lower domain, which facilitates the address management in the lower domain. For example, even if an NAT router is used in the lower domain and the identifier information available only in the domain such as a private address is assigned to each node, it is possible to send the partition information to the upper relay device by use of the address of the upper domain to which the relay device of the lower domain belongs. Thus, the node belonging to the lower domain need not know the address of the upper domain. Therefore, the registration and management of the address in the lower domain can be simplified.

In a preferred embodiment, each of said lower domains further comprises a lower setting device connected to its lower relay device. The lower setting device comprises: a lower reception unit configured to receive lower broker information indicative of a request of relaying between said nodes; a lower broker information storage unit configured to store the lower broker information received by said lower reception unit; a lower broker information setting unit configured to generate the lower partition information based on the lower broker information stored in said lower broker information storage unit; and a lower partition information update unit configured to update the lower partition information stored in said lower partition information storage unit to the lower partition information generated by said lower broker information setting unit.

According to this communication network system, it is possible to decide for each node in the lower domain whether relaying the communication is permitted or not.

In a preferred embodiment, the lower domain further comprises a lower authentication server configured to distribute a lower session key used for communication within the same lower domain. The upper domain further comprises an upper authentication server configured to distribute an upper session key used for communication within the same upper domain. The upper partition information update unit is configured to update the upper partition information stored in the upper partition information storage unit after the lower authentication server and the upper authentication server distribute the lower session key and the upper session key respectively.

According to this communication network system, the partition information can be modified in a secure manner. Thus, it is possible to prevent a third person from eavesdropping on the communication.

In a preferred embodiment, the lower domain further comprises a lower authentication server configured to distribute a lower session key used for communication within the same lower domain. The upper domain further comprises an upper authentication server configured to distribute an upper session key used for communication within the same upper domain. The upper partition information update unit is configured to update the upper partition information stored in the upper partition information storage unit after the upper authentication server distributes the upper session key. The lower partition information update unit is configured to update the lower partition information stored in the lower partition information storage unit after the lower authentication server distributes the lower session key.

According to this communication network system, both the partition information of the upper partition information storage unit and the partition information of the lower partition information storage unit are updated. Therefore, it is possible to manage the access control between the nodes at multiple sites. Therefore, the security of the communication between the nodes can be improved.

In a preferred embodiment, the lower partition information includes an identification number of the node belonging to the lower domain together with a local partition number and a global partition number respectively associated with the identification number. The local partition number is used for judging whether or not relaying between the nodes belonging to the same lower domain is allowed. The global partition number is used for judging whether or not relaying between the nodes belonging to the different domains is allowed.

According to this communication network system, the local partition information can be use for the communication between the nodes in the same domain, and the global partition information can be use for the communication between the nodes in the different domains. Therefore, suitable one or ones of the domains can be used depending on a situation. Further, it is possible to permit the communication within the domain and the communication between the different domains simultaneously.

In a preferred embodiment, the partition information includes an identification number of the node, and a partition number associated with the identification number. The routing unit is configured to control the relay unit in a manner to relay between the nodes which have the same partition number. The partition number is determined by use of both a network address and a subnet mask which are provided to the node.

According to this communication network system, the partition information can be adopted as the routing address. Thus, the access control can be made for each node. Further, the IP address including the private address based on the NAT can be used as the partition information. With using the private address alone, it is possible to establish the communication in the same domain without traversal of the NAT.

BRIEF DESCRIPTION OF DRAWINGS

FIG. 5 is a schematic diagram illustrating a modification of the communication format used in the first embodiment.

BEST MODE FOR CARRYING OUT THE INVENTION

First Embodiment

Figure 1:
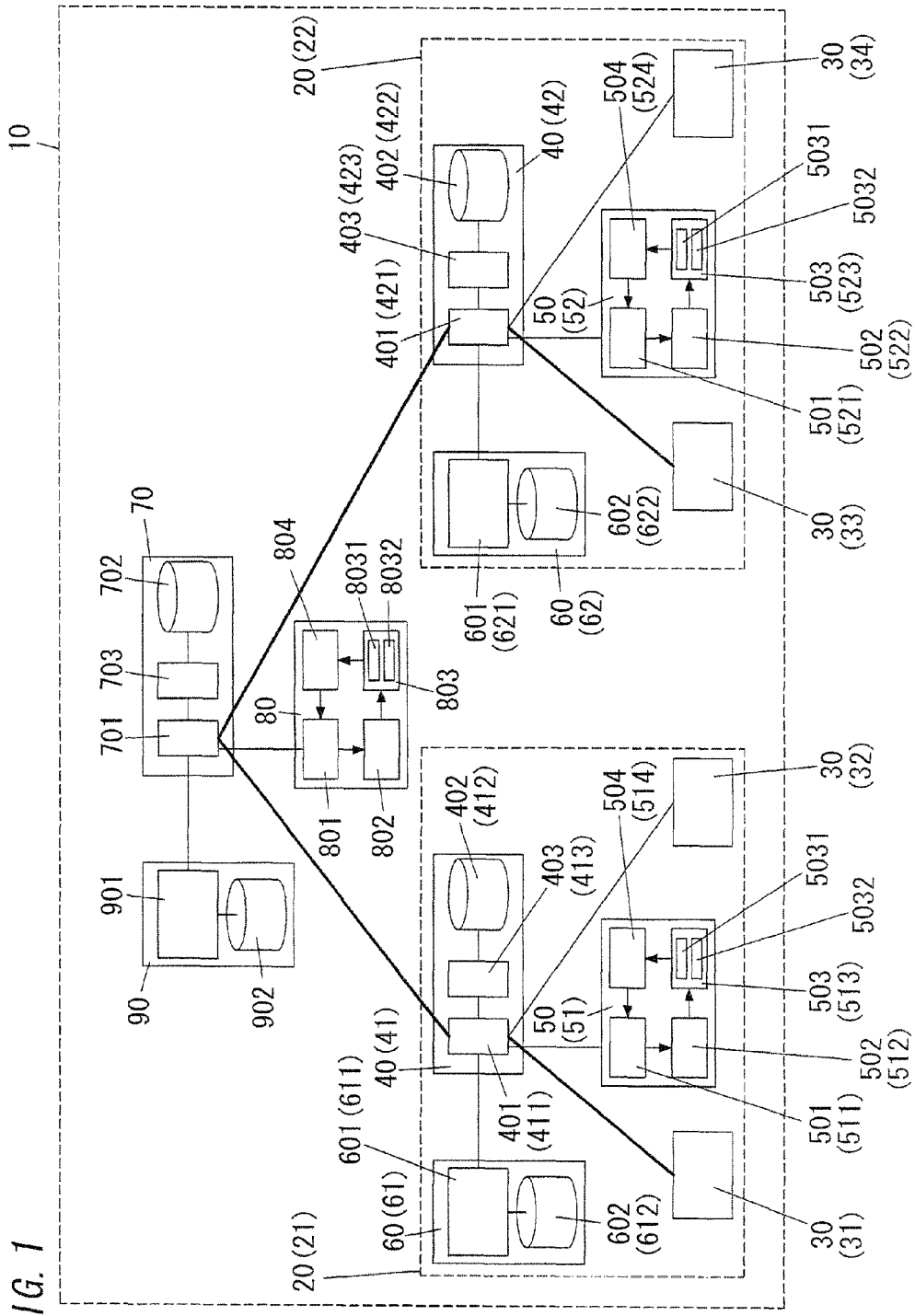
FIG. 1 is a block diagram illustrating a communication network system of the first embodiment.

As shown in FIG. 1, the communication network system of the present embodiment includes an upper domain 10. The upper domain 10 includes plural lower domains 20. Each of the lower domains 20 is a communication network (home network) installed in a residence. Thus, the communication network system of the present embodiment is defined as a multiple domain communication network including hierarchical domains.

In the present embodiment, the upper domain 10 includes two lower domains 20. In the following explanation, in order to distinguish between the two (first and second) lower domains 20, the first and second lower domains are designated by the reference numerals 21 and 22, respectively, if necessary.

Besides, the communication network system of the present embodiment is a double-layered hierarchical network, but may be a triple or more layered hierarchical network.

The lower domain 20 includes plural nodes (hereinafter, referred to as "terminal node") 30, a relay device (lower relay device) 40 interposed between the terminal nodes 30, a setting device (lower setting device) 50, and an authentication server (lower authentication server) 60.

In the present embodiment, each of the lower domains 21 and 22 includes two terminal nodes 30, one lower relay device 40, one lower setting device 50, and one lower authentication server 60.

Therefore, the communication network system of the present embodiment includes the four terminal nodes 30, the two lower relay devices 40, the two lower setting devices 50, and the two lower authentication servers 60.

In the following explanation, in order to distinguish between the four (first, second, third, and fourth) terminal nodes, the first, second, third, and fourth terminal nodes are designated by the reference numerals 31, 32, 33, and 34, respectively, if necessary. In order to distinguish between the two (first and second) lower relay devices 40, the first and second lower relay devices are designated by the reference numerals 41 and 42, respectively, if necessary. In order to distinguish between the two (first and second) lower setting devices 50, the first and second lower setting devices are designated by the reference numerals 51 and 52, respectively, if necessary. In order to distinguish between the two (first and second) lower authentication servers 60, the first and second lower authentication servers are designated by the reference numerals 61 and 62, respectively, if necessary.

The upper domain 10 further includes a relay device (upper relay device) 70, a setting device (upper setting device) 80, and an authentication server (upper authentication server) 90.

The upper relay device 70 is interposed between the lower relay devices 40 belonging to the different lower domains 20. For example, the upper relay device 70 is connected to the lower relay devices 41 and 42 via an external network such as the Internet.

The lower relay device 41 is connected to each of the terminal nodes 31 and 32 via a communication path (link) installed in a residence. The lower relay device 42 is connected to each of the terminal nodes 33 and 34 via a communication path (link) installed in a residence.

The lower relay device 40 is configured to function as a proxy server for connecting the home network to the external network. That is, the lower relay device 40 communicates to the upper relay device 70 on behalf of the terminal node 30 in the domain 20.

Identification information (address) for distinguishing between nodes (relay devices 41, 42, and 70, and terminal nodes 31, 32, 33, and 34) is given to each of the nodes. In the following explanation, the identification information of nodes is referred to as a node ID. When the relay devices 40 and 70 have a DHCP function, the node ID is dynamically assigned to each terminal node 30. Further, identification information is given to each of the domains 10, 21, and 22. The identification information for domains is referred to as a domain ID.

In the present embodiment, the terminal nodes 31, 32, 33, and 34 have the node IDs of C11, C12, C21, and C22, respectively. The upper relay device 70 has the node ID of A0. The lower relay devices 21 and 22 have the node IDs of B1 and B2, respectively. The upper setting device 80 has the node ID of Y0. The lower setting devices 51 and 52 have the node IDs of Y1 and Y2, respectively. In addition, the domains 10, 21, and 22 have the domain IDs of X0, X1, and X2, respectively.

Each terminal node 30 includes an electric device (not shown) for performing desired functions. In the following explanation, a unit for processing performed by the electric device is referred to as an object, and a service attribute concerning a service provided by the object is referred to as an interface. That is, the interface is defined as a program for making electric devices perform desired functions. The terminal node 30 has the object define as a group of the interfaces. In other words, the object is a program which defines use of the terminal node 30. Besides, plural terminal nodes 30 may have the same object. In this situation, by selecting the same object which the plural terminal nodes have, the plural terminal nodes 30 are selected simultaneously.

For example, when the electric device is a clock, the object is treated as "alarm clock". The object has the interfaces including a time setting function, an alarm function, and a temperature measurement function, for example. The object is realized by one or more programs (interfaces). Each of the terminal nodes 30 includes a storage device (not shown) configured to store an object identifier associated with an object, and an interface identifier associated with an interface included in the same object.

In the present embodiment, the first terminal node 31 includes a TV camera as the electric device for performing desired functions. The first terminal node 31 has a first object defined as an imaging function using the TV camera. The first object includes interfaces defined as services (service attributes) concerning functions of the TV camera, such as starting to image with the TV camera, terminating imaging with the TV camera, focusing the TV camera, and changing the field of view of the TV camera. The third terminal node 33 includes a monitor as the electric device for performing desired functions. The third terminal node 33 has a second object defined as a display function using the monitor. The second object includes interfaces defined as services concerning functions of the monitor, such as starting to display with the monitor and terminating displaying with the monitor.

For example, the lower domain 21 is a communication network in a residence of a child family unit and the lower domain 22 is a communication network in a residence of a parent family unit. In this example, according to cooperation of the terminal nodes 31 and 33 enables displaying, on the monitor (monitoring device compatible with network) of the terminal node 33 in the residence of the parent family unit, images of pets in the residence of the child family unit which is imaged by the TV camera (network camera) of the terminal node 31. When the terminal node 31 is controlled to cooperate with the terminal node 33 only while residents are absent from the residence of the child family unit, it is possible to display the images of the pets on the monitor of the terminal node 33 only while the residents are absent from the residence of the child family unit.

Alternatively, the terminal node 31 may have a switch, and the terminal node 33 may have an electric load device. In this instance, cooperation of the terminal nodes 31 and 33 enables controlling the electrical load device of the terminal node 33 by use of the switch of the terminal node 31. In another instance, the terminal node 31 may have a microphone, and the terminal node 33 may have a speaker. In this instance, cooperation of the terminal nodes 31 and 33 enables the speaker of the terminal node 33 to output sounds which is input into the microphone of the terminal node 31.

While the terminal nodes 31 and 33 cooperate with each other, data is transmitted from the terminal node 31 to the terminal node 33 by way of the lower relay device 41, the upper relay device 70, and the lower relay device 42.

Each terminal 30 includes a switch (not shown) for generating a trigger indicative of changing partition information explained below. This trigger defines broker information which is explained below.

The lower relay device 40 includes a relay unit (lower relay unit) 401, a partition information storage unit (lower partition information storage unit) 402, and a routing unit (lower routing unit) 403.

If necessary, the lower relay unit, the lower partition information storage unit, and the lower routing unit of the lower relay device 41 are designated by the reference numerals 411, 412, and 413, respectively. If necessary, the lower relay unit, the lower partition information storage unit, and the lower routing unit of the lower relay device 42 are designated by the reference numerals 421, 422, and 423, respectively.

The lower relay unit 401 is configured to relay the terminal nodes 30. The lower relay unit 401 functions as a relay node. The lower relay unit 401 is configured to transfer the broker information to the upper relay device 70, when the broker information from the lower node (terminal node 30) includes a request node ID indicative of a node ID which belongs to a different domain from the lower relay unit 401. The lower relay unit 401 is configured to transfer the broker information to the lower setting device 50, when the broker information from the lower node (terminal node 30) includes the request node ID indicative of a node ID which belongs to the same domain as the lower relay unit 401. According to a simplified instance, the lower relay unit 401 may be configured to transfer the broker information from the lower node (terminal node 30) to the upper relay device 70 as well as to the lower setting device 50.

The lower partition information storage unit 402 is configured to store the partition information (lower partition information). The lower partition information is defined to determine whether or not the lower relay unit 401 relays between nodes 30. That is, the partition information is defined to determine a cooperation relation between nodes.

The partition information includes the node ID and a partition number. In other words, the partition information is defined as a data pair including the node ID and the partition number.

The partition number is assigned to each of the domains 10, 21, and 22. In order to indicate a hierarchical relation between the domains, the partition number is expressed in a form with a dot placed between the numerals respectively representing the upper domain and the lower domain for separation thereof.

In the present embodiment, the upper domain 10 which is the upmost domain has the partition number of "1". The upper relay device 70 and the upper setting device 90 belong to only the upper domain 10. Therefore, the upper relay device 70 and the upper setting device 90 have the same partition number of "1".

The lower domain 21 has the partition number "1.1", and the lower domain 22 has the partition number "1.2". The digit on the left side of the dot indicates the partition number of the upper domain 10. The digit on the right side of the dot indicates a number for distinguishing between the lower domains 20. The lower relay device 41 has the partition number "1.1" of the lower domain 21 to which the lower relay device 41 belongs. The lower relay device 42 has the partition number "1.2" of the lower domain 22 to which the lower relay device 42 belongs.

For example, the lower partition information storage unit 412 stores, as default partition information, the lower partition information shown in the following table 1. The lower partition information storage unit 422 stores, as default partition information, the lower partition information shown in the following table 2.

TABLE 1

| node ID | partition number |
|---------|------------------|
| A0      | 1                |
| B1      | 1.1              |
| C11     | 1.1              |
| C12     | 1.1              |
| Y1      | 1.1              |

TABLE 2

| node ID | partition number |
|---------|------------------|
| A0      | 1                |
| B2      | 1.2              |
| C21     | 1.2              |
| C22     | 1.2              |
| Y2      | 1.2              |

The lower routing unit 403 is configured to control the lower relay unit 401 in conformity with the lower partition information stored in the lower partition information storage unit 402. In other words, the lower routing unit selects either permission or prohibition of the communication between the terminal nodes on the basis of the lower partition information stored in the lower partition information storage unit 402.

The routing unit 403 performs control (access control) of the lower relay unit 401 in conformity with the following rules.

Rule 1: when the nodes have the same partition number, these nodes are permitted to communicate with each other.

Rule 2: when the partition number is found to indicate the partition number of the lower domain of "0" (i.e., the digit of "0" on the right side of "."), it is permitted to transmission between the nodes having the same partition number indicative of the upper domain.

In the rule 2, the digit of "0" on the right side of "." indicates a wild card which is regarded as identical to any digit on the right side of ".". In addition, "0.0" is not expressed. For example, "1.0" is abbreviated to "1".

The lower routing unit 403 is configured to, upon receiving the lower partition information from the lower setting device 50, update the lower partition information stored in the lower partition information storage unit 402 to the received lower partition information.

The lower routing unit 403 is configured to, upon receiving a reset signal from the lower setting device 50, return the lower partition information stored in the lower partition information storage unit 402 to the default lower partition information.

The upper relay device 70 includes a relay unit (upper relay unit) 701, a partition information storage unit (upper partition information storage unit) 702, and a routing unit (upper routing unit) 703.

The upper relay unit 701 is configured to relay between the lower relay units 401. Further, the upper relay unit 701 is configured to transfer to the upper setting device 80 the broker information received from the lower relay device 40.

The upper partition information storage unit 702 is configured to store partition information (upper partition information). The upper partition information is defined to determine whether or not the upper relay unit 701 relays between the lower relay units 401.

For example, the upper partition information storage unit 702 stores, as default partition information, the upper partition information shown in the following table 3.

TABLE 3

| node ID | partition number |
|---------|------------------|
| A0 | 1 |
| Y0 | 1 |
| B1 | 1.1 |
| B2 | 1.2 |

The upper routing unit 703 is configured to control the upper relay unit 701 in conformity with the upper partition information stored in the upper partition information storage unit 702.

The upper routing unit 703 performs control (access control) of the upper relay unit 701 in conformity with the same rule 1) and rule 2) as the lower routing unit 403. The upper routing unit 703 is configured to, upon receiving the upper partition information from the upper setting device 80, update the upper partition information stored in the upper partition information storage unit 702 to the received upper partition information. The upper routing unit 703 is configured to, upon receiving a reset signal from the upper setting device 80, return the upper partition information stored in the upper partition information storage unit 702 to the default upper partition information (partition information shown in table 3, in the present embodiment).

In the present embodiment, the partition information storage units 402 and 702 are incorporated into the relay devices 40 and 70, respectively. However, the partition information storage units 402 and 702 may be physically separated from the relay devices 40 and 70, respectively. In this instance, the partition information storage units 402 and 702 are configured to communicate with the relay devices 40 and 70, respectively.

In the present embodiment, the setting devices 50 and 80 are physically separated from the relay devices 40 and 70, respectively. Therefore, the setting devices 50 and 80 are configured to communicate with the relay devices 40 and 70, respectively. However, the setting devices 50 and 80 are incorporated into the relay devices 40 and 70, respectively.

The lower authentication server 60 serves to distribute a session key (lower session key) for encrypting communication between the lower relay device 40 and another node. The lower authentication servers 61 and 62 are connected to the lower relay devices 41 and 42, respectively.

The lower authentication server 60 includes a key distribution unit (lower key distribution unit) 601 and a key storage unit (lower key storage unit) 602. If necessary, the lower key distribution unit and the lower key storage unit of the lower authentication server 61 are designated by reference numerals 611 and 612, respectively. If necessary, the lower key distribution unit and the lower key storage unit of the lower authentication server 62 are designated by reference numerals 621 and 622, respectively.

The lower key storage unit 602 is configured to store a secret key (lower secret key) defined as a common key shared with each node in order to encrypt the lower session key and distribute the encrypted lower session key to each node. The lower secret key is prepared for each node which is a candidate to which a session key is distributed. Each node which is a candidate to which a session key is distributed has a lower secret key.

In the present embodiment, the lower key storage unit 602 is separated from the lower key distribution unit 601. Alternatively, the lower key storage unit 602 and the lower key distribution unit 601 may be formed as a single member.

The lower key distribution unit 601 is configured to distribute the lower session key to the lower relay device 40 in response to a request from the lower relay device 40. When the lower key distribution unit 601 distributes the lower session key to the lower relay device 40, the lower key distribution unit 601 encrypts the lower session key with the secret key stored in the lower key storage unit 602.

The upper authentication server 90 serves to distribute a session key (upper session key) for encrypting communication between the upper relay device 70 and another node. The upper authentication server 90 is connected to the upper setting device 70.

The upper authentication server 90 includes a key distribution unit (upper key distribution unit) 901 and a key storage unit (upper key storage unit) 902.

The upper key storage unit 902 is configured to store a secret key (upper secret key) defined as a common key shared with each node in order to encrypt the upper session key and distribute the encrypted upper session key to each node. The upper secret key is prepared for each node which is a candidate to which a session key is distributed. Each node which is a candidate to which a session key is distributed has an upper secret key.

The upper key storage unit 902 stores data including three elements, that is, the node ID or domain ID, the secret key, and the partition number. In the present embodiment, the upper key storage unit 902 is separated from the upper key distribution unit 901. The upper key storage unit 902 may be formed integrally with the upper key distribution unit 901.

The upper key distribution unit 901 is configured to distribute the upper session key to the upper relay device 70 in response to a request from the upper relay device 70. When the upper key distribution unit 901 distributes the upper session key to the upper relay device 70, the upper key distribution unit 901 encrypts the upper session key with the secret key stored in the upper key storage unit 902.

As described in the above, each node encrypts data with its session key. The upper relay device 70 uses the session key (upper session key) distributed from the upper authentication server 90 in order to communicate with a node in the upper domain 10, such as the upper setting device 80, and a node (e.g., the lower relay device 40, the terminal node 30, and the lower setting device 50) in the lower domain 20. The lower relay device 41 uses the lower session key distributed from the lower authentication server 61 in order to communicate with a node (e.g., the terminal nodes 31 and 32, and the lower setting device 51) in the lower domain 21 to which the lower relay device 41 belongs. Similarly, the lower relay device 42 uses the lower session key distributed from the lower authentication server 62 in order to communicate with a node (e.g., the terminal nodes 33 and 34, and the lower setting device 52) in the lower domain 22 to which the lower relay device 42 belongs.

The key storage units 902, 612, and 622 store key data shown in tables 4 to 6, respectively. The key data is defined as data in which the node ID or domain ID, the secret key, and the partition number are associated with each other. The key data is represented as (node ID or domain ID, secret key, partition number). The upper secret key is associated with the domain ID for the purpose of allocating the upper secret key to each lower domain 20.

TABLE 4

| node ID or domain ID | secret key | partition number |
|---|---|---|
| A0 | Ka0 | 1 |
| X1 | Kdx1 | 1.1 |
| X2 | Kdx2 | 1.2 |
| 0 | Ky0 | 1 |

TABLE 5

| node ID or domain ID | secret key | partition number |
|---|---|---|
| B1 | Kb0 | 1.1 |
| C11 | Kc11 | 1.1 |
| C12 | Kc12 | 1.1 |

TABLE 6

| node ID or domain ID | secret key | partition number |
|---|---|---|
| B2 | Kb2 | 1.2 |
| C21 | Kc21 | 1.2 |
| C22 | Kc22 | 1.2 |

The upper key distribution unit 901 generates a session key when any one of the lower relay devices 41 and 42 requests distribution of the session key. The session key is shared by two nodes or domains which communicate with each other. The upper key distribution unit 901 obtains from the upper key storage unit 902 the secret keys Kdx1 and Kdx2 which are associated with the domain IDs (X1, X2) of the lower domains 21 and 22 managed by the lower relay devices 41 and 42 respectively. The upper key distribution unit 901 encrypts the session key with obtained secret key Kdx1 and distributes it to the lower relay device 41. The upper key distribution unit 901 encrypts the session key with the obtained secret key Kdx2 and distributes it to the lower relay device 42. Upon receiving the encrypted session key (ticket), each of the lower relay devices 41 and 42 decrypts the ticket with its own secret key, thereby obtaining the session key.

The lower key distribution unit 611 generates a session key when any one of the nodes 31 and 32 requests distribution of the session key. The lower key distribution unit 612 generates a session key when any one of the nodes 33 and 34 requests distribution of the session key. The session key is shared by two nodes or domains which communicate with each other. The lower key distribution unit 601 obtains from the lower key storage unit 602 the secret keys Kc11 and Kc12 which are associated with the node IDs of the terminal nodes 31 and 32 respectively. The lower key distribution unit 601 obtains from the lower key storage unit 602 the secret keys Kc21 and Kc22 which are associated with the node IDs of the terminal nodes 33 and 34 respectively. The lower key distribution Unit 601 encrypts the session key with obtained secret key Kc11 and distributes it to the terminal node 31, and encrypts the session key with obtained secret key Kc12 and distributes it to the terminal node 32. The lower key distribution unit 601 encrypts the session key with obtained secret key Kc21 and distributes it to the terminal node 33, and encrypts the session key with obtained secret key Kc22 and distributes it to the terminal node 34. Upon receiving the encrypted session key (ticket), each of the terminal nodes 31, 32, 33, and 34 decrypts the ticket with its own secret key, thereby obtaining the session key.

The key distribution units 901, 611, and 612 are configured to update the partition information (partition numbers) of the key storage units 902, 612, and 622, respectively after distributing the session key. Besides, the key distribution units 901, 611, and 612 are configured to return the partition information stored in the key storage units 902, 612, and 622 to the default partition information, upon receiving a reset signal from the setting devices 80, 51, and 52, respectively.

For example, when the lower relay device 41 requests distribution of session keys in order to establish communication between the lower relay device 41 and the upper relay device 70, the upper authentication server 90 distributes the upper session key to both the upper relay device 70 and the lower relay device 41. In addition, the upper authentication server 90 updates the partition information regarding both the upper relay device 70 and the lower domain 21 to which the lower relay device 41 belongs. Besides, in this instance, the lower domain 21 has the partition number "1.1" and the upper relay device 70 has the partition number "1". The communication between the lower relay device 41 and the upper relay device 70 is permitted even before the partition information is updated. In other words, the lower relay device 41 is allowed to communicate with the upper relay device 70. Therefore, actually, the partition information stored in the upper key storage unit 902 is not updated.

For example, when the distribution of the session key is requested in order to establish communication between the lower domains 21 and 22, the upper authentication server 90 distributes the session key to the lower relay devices 41 and 42. In addition, the upper authentication server 90 updates the partition information (partition numbers) regarding both the lower domains 21 and 22 to which the lower relay devices 41 and 42 belong respectively. In this instance, the partition number of one of the lower domains 21 and 22 is changed so as to be identical to the partition number of the other of the lower domains 21 and 22. For example, in the instance shown in table 4, the partition number of the lower domain 21 is modified from "1.1" to "1.2".

The lower setting device 51 is connected to the lower relay device 41. The lower setting device 52 is connected to the lower relay device 42.

Each lower setting device 50 includes a communication unit (lower communication unit) 501, a broker information storage unit (lower broker information storage unit) 502, a broker information setting unit (lower broker information setting unit) 503, and a partition information update unit (lower partition information update unit) 504.

If necessary, the lower communication unit, the lower broker information storage unit, the lower broker information setting unit, and the lower partition information update unit belonging to the lower setting device 51 are designated by the reference numerals 511, 512, 513, and 514, respectively. Similarly, if necessary, the lower communication unit, the lower broker information storage unit, the lower broker information setting unit, and the lower partition information update unit belonging to the lower setting device 52 are designated by the reference numerals 521, 522, 523, and 524, respectively.

The lower communication unit 501 is configured to establish communication with the lower relay device 40 which is connected to the lower communication unit 501. The lower communication unit 501 functions as a reception unit (lower reception unit) configured to receive the broker information indicative of a request of relaying between the lower relay units 401.

The lower broker information storage unit 502 is configured to store the lower broker information received by the lower communication unit 501.

The broker information is defined to indicate a cooperation relation between the terminal nodes 30 included in the lower domain 20. The broker information includes information indicative of a source, information indicative of a domain to which the source belongs, and information indicative of a destination. For example, the broker information is defined as data including the node ID of the source, the domain ID of the domain to which the source belongs, and the node ID (request node ID) of the destination. In the following explanation, the broker information is represented as (node ID of source, domain ID of domain to which source belongs, request node ID). The source is defined as the terminal node 30 which requests the relay device 40 to relay a signal. The destination is defined as the terminal node 30 designated as a destination of the signal which the relay device 40 relays. In other words, the destination is defined as the terminal node 30 which the source requests to receive the signal. For example, the broker information (C11, X1, C21) indicates that the terminal node C11 requests the terminal node C21 to provide its services.

The lower broker information setting unit 503 is configured to generate the lower partition information based on the lower broker information stored in the lower broker information storage unit 502.

The lower broker information setting unit 503 includes a broker information judgment module (lower broker information judgment module) 5031 and a partition information generation module (lower partition information generation module) 5032. The broker information judgment module 5031 is configured to, in response to the lower broker information storage unit 502 storing two pieces of the lower broker information (first lower broker information and second lower broker information), judge whether or not the source and the destination indicated by the first lower broker information are identical to the destination and the source indicated by the second lower broker information respectively. The lower partition information generation module 5032 is configured to generate the lower partition information when the lower broker information judgment module 5031 determines that the source and the destination indicated by the first lower broker information are identical to the destination and the source indicated by the second lower broker information respectively. The lower partition information indicates the lower relay unit 401 is allowed to relay between the source indicated by the first lower broker information and the destination indicated by the first lower broker information (in other words, relay between the source indicated by the second lower broker information and the destination indicated by the second lower broker information).

The lower partition information update unit 504 controls the lower communication unit 501 in a manner to send the lower partition information generated by the lower broker information setting unit 503 to the lower relay device 40. Thus, the lower partition information update 504 updates the lower partition information stored in the lower partition information storage unit 402 to the lower partition information generated by the lower broker information setting unit 503.

Further, on behalf of the terminal node 30, the lower partition information update unit 504 requests the lower authentication server 60 to distribute a session key. That is, the lower partition information update unit 504 controls, on the basis of the lower partition information generated by the lower broker information setting unit 503, the lower communication unit 501 in a manner to send a message of requesting distribution of the session key to two nodes which request to communicate with each other. Further, the lower partition information update unit 504 controls the lower communication unit 501 in a manner to send the lower partition information generated by the lower broker information setting unit 503 to the lower authentication server 60. Consequently, the lower authentication server 60 distributes the session key, and updates the partition information (partition numbers).

As described in the above, the lower setting device 50 provides a broker service of updating the data (partition information) stored in the lower key storage unit 602 as well as the data (partition information) stored in the lower partition information storage unit 402.

The upper setting device 80 is connected to the upper relay device 70. The upper setting device 80 includes a communication unit (upper communication unit) 801, a broker information storage unit (upper broker information storage unit) 802, a broker information setting unit (upper broker information setting unit) 803, and a partition information update unit (upper partition information update unit) 804.

The upper communication unit 801 is configured to communicate with the upper relay device 70. The upper communication unit 801 functions as a reception unit (upper reception unit) configured to receive the upper broker information indicative of a request of relaying between the lower relay units 401. The upper broker information is, moreover, defined as information indicative of the cooperation relation between the terminal nodes 30 included in the lower domain 20.

The upper broker information storage unit 802 is configured to store the upper broker information received by the upper communication unit 801.

The upper broker information setting unit 803 is configured to generate the upper partition information based on the upper broker information stored in the upper broker information storage unit 802.

The upper broker information setting unit 803 includes a broker information judgment module (upper broker information judgment module) 8031 and a partition information generation module (upper partition information generation module) 8032. The upper broker information judgment module 8031 is configured to, in response to the upper broker information storage unit 802 storing two pieces of the upper broker information (first upper broker information and second upper broker information), judge whether or not the source and the destination indicated by the first upper broker information are identical to the destination and the source indicated by the second upper broker information respectively. The upper partition information generation module 8032 is configured to generate the upper partition information when the upper broker information judgment module 8031 determines that the source and the destination indicated by the first upper broker information are identical to the destination and the source indicated by the second upper broker information respectively. The upper partition information indicates the upper relay unit 701 is allowed to relay between the source indicated by the first upper broker information and the destination indicated by the first upper broker information (in other words, relay between the source indicated by the second upper broker information and the destination indicated by the second upper broker information).

The upper partition information update unit 804 controls the upper communication unit 801 in a manner to send the upper partition information generated by the upper broker information setting unit 803 to the upper relay device 70. Thus, the upper partition information update 804 updates the upper partition information stored in the upper partition information storage unit 702 to the upper partition information generated by the upper broker information setting unit 803.

Further, on behalf of the relay device 40 or 70, or the terminal node 30, the upper partition information update unit 804 requests the upper authentication server 90 to distribute the session key. That is, the upper partition information update unit 804 controls, on the basis of the upper partition information generated by the upper broker information setting unit 803, the upper communication unit 801 in a manner to send a message of requesting distribution of the session key to two nodes which request to communicate with each other. Further, the upper partition information update unit 804 controls the upper communication unit 801 in a manner to send the upper partition information generated by the upper broker information setting unit 803 to the upper authentication server 90. Consequently, the upper authentication server 90 distributes the session key, and updates the partition information (partition numbers).

As described in the above, the upper setting device 80 provides a broker service of updating the data (partition information) stored in the upper key storage unit 902 as well as the data (partition information) stored in the upper partition information storage unit 402.

The following explanation is made to operation of the communication network system of the present embodiment.

First, an explanation is made to operation of the upper setting device 80. In an initial state, the lower partition information storage unit 412 stores the lower partition information shown in table 1, and the lower partition information storage unit 422 stores the lower partition information shown in table 2.

According to the lower partition information shown in table 1, the lower relay device 41 and the terminal nodes 31 and 32 have the same partition number. Therefore, the lower routing unit 413 permits, in conformity with the rule 1, the communication between the lower relay device 41 and the first terminal node 31 and the communication between the lower relay device 41 and the second terminal node 32. Further, the lower routing unit 413 permits the communication between the terminal nodes 31 and 32. Therefore, the first terminal node 31 and the second terminal node 32 can communicate with each other.

The upper relay device 70 is different in the partition number from the lower relay device 41 and the terminal nodes 31 and 32. However, the lower routing unit 413 permits, in conformity with the rule 2, the communication between the lower relay device 41 and the upper relay device 70 and the communication between the upper relay device 70 and the terminal nodes 31 and 32. According to the rule 1, the communication between the lower relay device 41 and the first terminal node 31 is permitted, and the communication between the lower relay device 41 and the second terminal node 32 is permitted. Thus, the upper relay device 70 can communicate with the lower relay device 41 and the terminal nodes 31 and 32.

The lower routing unit 413 determines whether or not the communication path(s) between the nodes is valid. The lower routing unit 413 permits the communication between the nodes when all the communication path(s) between the nodes is valid. The lower routing unit 413 prohibits the communication between the nodes when at least one of the communication path(s) between the nodes is invalid.

Moreover, according to the lower partition information shown in table 1, the lower relay device 41 is the same in the partition number as the lower setting device 51. Therefore, the lower routing unit 413 permits the communication between the lower relay device 41 and the lower setting device 51.

According to the lower partition information shown in table 2, the lower routing unit 423 permits the communication between the terminal nodes 33 and 34. Further, the lower routing unit 423 permits the communication between the upper relay device 70 and the lower relay device 42 as well as the terminal nodes 33 and 34. Moreover, the lower routing unit 423 permits the lower relay device 42 and the lower setting device 52.

Further, in the initial state, the upper partition information storage unit 702 stores the upper partition information shown in table 3.

According to the upper partition information shown in table 3, the upper relay device 70 has the same partition number as the upper setting device 80. Therefore, the upper routing unit 703 permits the communication between the upper relay device 70 and the upper setting device 80. Meanwhile, the lower relay device 41 has the different partition number from the lower relay device 42. Therefore, the upper routing unit 703 does not permit the communication between the lower relay devices 41 and 42. That is, in the initial state, the communication between the lower domains 20 is prohibited.

The upper partition information shown in table 3 indicates that the upper relay device 70 and the upper setting device 80 have the partition number "1 (=1.0)" and that the lower relay devices 41 and 42 have the partition numbers "1.1" and "1.2" respectively. Therefore, in conformity with the rule 2, the upper routing unit 703 permits the upper relay device 70 and the upper setting device 80 to communicate with the lower relay devices 41 and 42.

As described above, in the initial state, the communication between the nodes included in the same lower domain 20 is permitted, and the communication between the nodes included in the different lower domains 20 is prohibited. Further, the upper relay device 70 is allowed to communicate to the lower relay devices 41 and 42 as well as the terminal nodes 31 to 34. In other words, the upper relay device can communicate to all the nodes included in the upper domain 10.

In order to permit the communication between the different domains 21 and 22, the partition information of the upper partition information is changed to that shown in table 7, for example.

TABLE 7

| node ID | partition number |
|---|---|
| A0 | 1 |
| Y0 | 1 |
| B1 | 1.2 |
| B2 | 1.2 |

According to the partition information shown in table 7, the lower relay device 41 has the partition number "1.2". That is, the partition number of the lower relay device 41 is changed from "1.1" to "1.2". Thus, in the partition information, the lower relay device 41 has the same partition number as the lower relay device 42. Therefore, the upper routing unit 703 permits the communication between the lower relay devices 41 and 42. In other words, the communication between the lower domains 21 and 22 is permitted. Besides, changing the partition number of the lower relay device 42 from "1.2" to "1.1" gives the same effect mentioned above.

The lower relay device 41 is allowed to communicate to the terminal nodes 31 and 32 included in the lower domain 21. Further, the lower relay device 42 is allowed to communicate to the terminal nodes 33 and 34 included in the lower domain 22. Therefore, the terminal nodes 31 and 33 are permitted to communicate to each other via the relay devices 41, 42, and 70.

Figure 2:
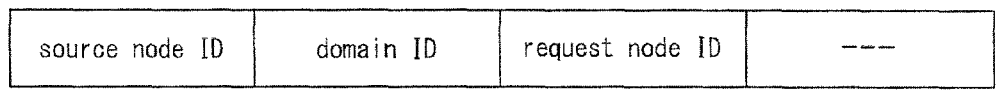
FIG. 2 is a schematic diagram illustrating a communication format used in the communication network system of the first embodiment.

In order to permit and prohibit the communication between the terminal nodes 30 included in the different domains 21 and 22, it is necessary to change the upper partition information stored in the upper partition information storage unit 702. In the present embodiment, when relaying between the particular terminal node 30 and the targeted terminal node 30 is requested, the particular terminal node 30 is controlled to transmit to the targeted terminal node 30 the broker information including the node ID of the targeted terminal node 30. In addition, the targeted terminal node 30 is controlled to send the broker information including the node ID of the particular terminal node 30. The broker information includes, as shown in FIG. 2, the node ID (source node ID) of the source sending the broker information, the domain ID designating the domain to which the source belongs, and the request node ID defined as the node ID with which the source requests to cooperate.

Figure 3:
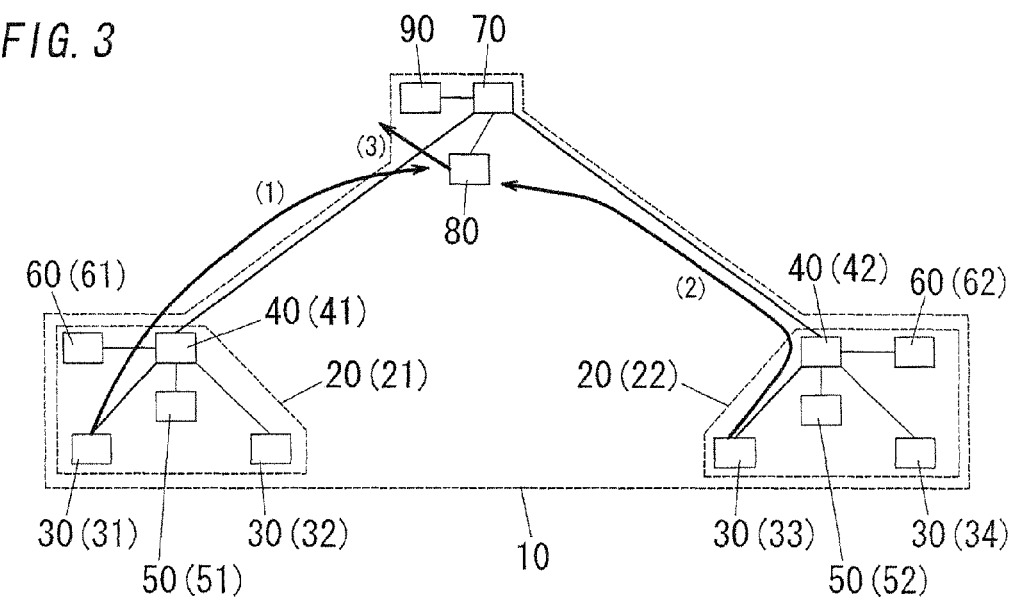
FIG. 3 is a schematic configuration diagram illustrating the communication network system of the first embodiment.

When allowance of the communication between the first terminal node 31 and the third terminal node 33 is requested, the first terminal node 31 transmits the broker information (C11, X1, C21) to the upper relay device 70 via the lower relay device 41 ((1) in FIG. 3). In the present embodiment, this broker information means that the first terminal node 31 can provide a service (service of providing an image generated by the TV camera) to the third terminal node 33.

The upper relay device 70 transfers the received broker information to the upper setting device 80. Thus, the upper communication module 801 of the upper setting device 80 receives the broker information from the first terminal node 31. The upper broker information storage unit 802 stores the broker information which the upper communication module 801 has received. Therefore, the upper broker information storage unit 802 stores the broker information (first broker information) illustrated in the upper row in table 8.

When the upper broker information storage unit 802 stores the broker information, the upper setting device 80 permits the node having the request node ID of the stored broker information to consult the stored broker information. Since the node ID of the third terminal node 33 is identical to the request node ID of the broker information stored in the upper broker information storage unit 802, the third terminal node 33 is allowed to consult data (e.g., the broker information).

When the third terminal node 33 requests to receive the service (i.e., the service of displaying an image generated by the TV camera on the monitoring device) provided by the first terminal node 31, the third terminal device 33 sends the broker information (C21, X2, C11) to the upper relay device 70 via the lower relay device 42 ((2) in FIG. 3).

The upper relay device 70 transfers the received broker information to the upper setting device 80. Thus, the upper communication module 801 of the upper setting device 80 receives the broker information from the third terminal node 33.

The upper broker information storage unit 802 stores the broker information which the upper communication module 801 has received. Therefore, the upper broker information storage unit 802 stores the broker information (second broker information) illustrated in the lower row in table 8.

Thus, the upper broker information storage unit 802 stores two pieces of the broker information shown in table 8, as the information indicating the cooperation relation between the terminal nodes 31 and 33.

When the upper broker information storage unit 802 stores the two pieces of the broker information (first broker information and second broker information), the upper broker information judgment module 803 judges whether or not the source and the destination indicated by the first broker information are identical to the destination and the source indicated by the second broker information respectively.

Table 8 exhibits the first broker information in which the source is the first terminal node 31 and the destination is the third terminal node 33, and the second broker information in which the source is the third terminal node 33 and the destination is the first terminal node 31.

Consequently, the upper broker information setting unit 803 generates the partition information for allowing the upper relay unit 701 to relay between the source (first terminal node 31) indicated by the first broker information and the destination (third terminal node 33) indicated by the first broker information.

The upper partition information update unit 804 sends the upper partition information generated by the upper broker information setting unit 803 to the upper relay device 70. Thus, the upper partition information update unit 804 updates the upper partition information stored in the upper partition information storage unit 702 to the upper partition information generated by the upper broker information setting unit 803.

Moreover, the upper partition information update unit 804 requests the upper authentication server 90 to distribute a session key. In addition, the upper partition information update unit 804 transmits the upper partition information generated by the upper broker information setting unit 803 to the upper authentication server 90 ((3) in FIG. 3). Thus, the upper authentication server 90 distributes a session key and updates the partition information (partition number).

According to the aforementioned operation, data can be transmitted between the lower domains 21 and 22 through the upper relay device 70. In other words, the communication between the lower domains 21 and 22 is permitted.

Besides, the first terminal node 31 establishes encrypted communication with the lower relay device 41 by use of a session key. The second terminal node 32 establishes encrypted communication with the lower relay device 42 by use of a session key. Each of the lower relay devices 41 and 42 establishes encrypted communication with the upper relay device by use of a session key.

As described in the above, the communication network system of the present embodiment can dynamically switch between the permission and the prohibition of the communication between the nodes (e.g., the terminal node 30 and the relay device 40) on the basis of the upper partition information stored in the partition information storage unit 702.

Next, an explanation is made to operation of the lower setting device 50. Besides, the lower setting devices 51 and 52 operate in a similar manner. Therefore, the explanation is made to only the lower setting device 51.

In an initial state, the lower partition information storage unit 412 stores the lower partition information shown in table 9.

TABLE 8

| source node ID | domain ID | request node ID |
|---|---|---|
| C11 | X1 | C21 |
| C21 | X2 | C11 |

TABLE 9

| node ID | partition number |
|---|---|
| A0 | 1 |
| B1 | 1.1 |
| C11 | 1.1 |

TABLE 9-continued

| node ID | partition number |
|---|---|
| C12 | 1.2 |
| Y1 | 1.1 |

According to the lower partition information shown in table 8, the partition number of the lower relay device 41 is identical to the partition number of the first terminal node 31 but is different from the partition number of the second terminal node 32. Therefore, the lower routing unit 413 prohibits, in conformity with the rule 1, the communication between the terminal nodes 31 and 32.

In order to permit the communication between the terminal nodes 30 and 31 included in the domain 21, it is necessary to change the lower partition information stored in the lower partition information storage unit 702 to the lower partition information shown in table 1.

When the first terminal node 31 requests the cooperation between the first terminal node 31 and the second terminal node 32, the first terminal node 31 sends the broker information (C11, X1, C12) to the lower relay device 41. The lower relay device 41 transfers the received broker information to the lower setting device 51.

Thus, the lower communication module 511 receives the broker information from the first terminal node 31. The lower broker information storage unit 512 stores the broker information received by the lower communication module 511.

When the second terminal node 32 accepts the request of the cooperation between the first terminal node 31 and the second terminal node 32, the second terminal node 32 sends the broker information (C12, X1, C11) to the lower relay device 41. The lower relay device 41 transfers the received broker information to the lower setting device 51.

Thus, the lower communication module 511 receives the broker information from the second terminal node 32. The lower broker information storage unit 512 stores the broker information received by the lower communication module 511.

Consequently, the lower broker information storage unit 512 stores the broker information (C11, X1, C12) and the broker information (C12, X1, C11). Therefore, the lower broker information setting unit 513 generates the partition information (partition information shown in table 1) for allowing the relay between the first terminal node 31 and the second terminal node 32.

The lower partition information update unit 514 sends the lower partition information generated by the lower broker information setting unit 513 to the lower relay device 41.

Thus, the lower partition information update unit 514 updates the lower partition information stored in the lower partition information storage unit 412 to the lower partition information generated by the lower broker information setting unit 513.

Moreover, the lower partition information update unit 514 requests the lower authentication server 61 to distribute a session key. In addition, the lower partition information update unit 514 transmits the lower partition information generated by the lower broker information setting unit 513 to the lower authentication server 61. Thus, the lower authentication server 61 distributes the session key and updates the partition information (partition number).

According to the aforementioned operation, the terminal nodes 31 and 32 included in the same lower domains 21 can transmit data to each other through the lower relay device 41.

Besides, the partition information stored in the partition information storage units 402 and 702 may be changed by use of a web server (not shown). In this instance, the partition information is changed by means of accessing the web server via a terminal device such as a personal computer. The relay devices 40 and 70 may be used as the aforementioned web server.

The broker information setting units 803 and 503 may be configured to generate the partition information for allowing the relay units 701 and 401 to relay the source and the destination of the broker information on the basis of a single piece of the broker information stored in the broker information storage units 802 and 502, respectively.

The broker information may include a user ID given to a user. In other words, the setting devices 50 and 80 may be configured to perform user authentication. With this arrangement, it is possible to prevent invalid modification of the cooperation relation between the nodes. In addition, the broker information may be transmitted by means of encrypted communication. With this arrangement, the security can be improved.

The setting device 50 or 80 may be used as a web server. In this instance, the broker information is changed by means of accessing the setting device 50 or 80 by way of a terminal device such as a personal computer. Besides, the setting device 50 or 80 may be configured to perform authentication for a user accessing it by use of the terminal device. When a user accesses the setting device 50 or 80 from at least one of the domains 21 and 22 by use of the terminal device, the authentication server 90 can authenticate the terminal device. Therefore, it is possible to change the broker information in a secure manner. The broker information can be changed by use of an entry form of the HTML provided to the setting devices 50 and 80. For example, the entry form may be designed to request input of the source node ID, the domain ID designating the domain including the source, and the request node ID.

Figure 4:
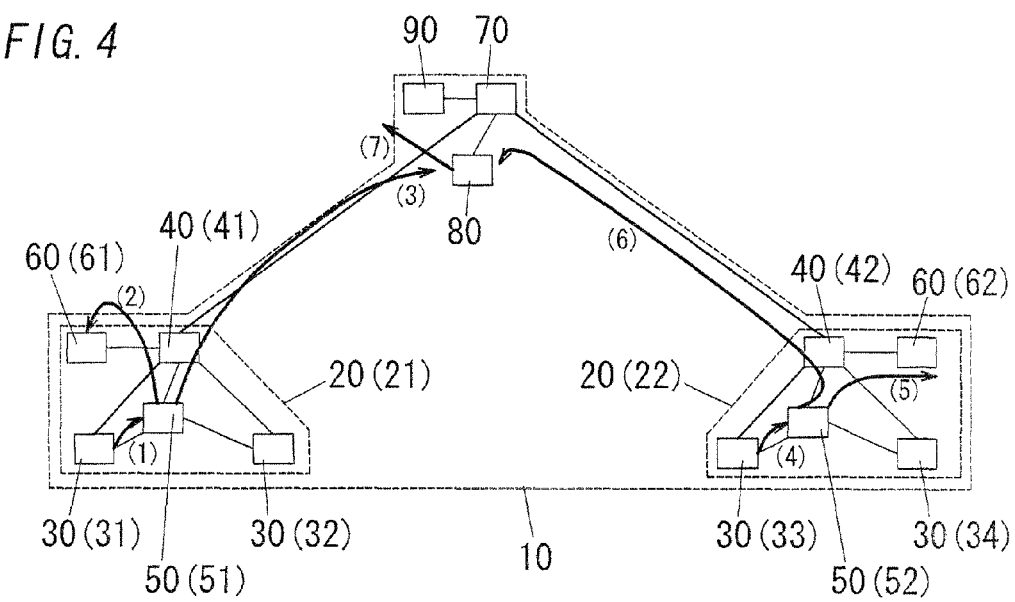
FIG. 4 is a schematic configuration diagram illustrating a modification of the communication network system of the first embodiment.

FIG. 4 illustrates the communication network system in accordance with a modification of the present embodiment. In this modification, the terminal nodes 31 and 32 are connected to the lower setting device 51 via communication paths, respectively. Further, the terminal nodes 33 and 34 are connected to the lower setting device 52 via communication paths, respectively.

The terminal nodes 31 and 32 are configured to send the broker information to the lower setting device 51 rather than the lower relay device 41. Similarly, the terminal nodes 33 and 34 are configured to send the broker information to the lower setting device 52 rather than the lower relay device 42.

With regard to the lower setting device 50, the broker information storage unit 502 stores the broker information received by the lower communication unit 501. In addition, the lower partition information update unit 504 is configured to transfer the broker information received from the terminal node 30 to the lower relay device 40. The lower partition information update unit 504 requests the lower authentication server 60 to distribute a lower session key, before sending the broker information to the lower relay device 40. That is, the lower partition information update unit 504 encrypts the broker information with the lower session key distributed from the lower authentication server 60 and sends the encrypted broker information to the upper relay device 70. Further, the lower partition information update unit 504 encrypts the lower partition information with the lower session key distributed from the lower authentication server 60 and sends the encrypted lower partition information to the lower relay device 40. In other words, the lower partition information update unit 504 is configured to update the lower partition information stored in the lower partition information storage unit 402 after the lower authentication server 60 distributes the lower session key.

With regard to the lower relay device 40, the relay device 401 is configured to transfer to the upper relay device 70 (upper setting device 80) the broker information received from the lower setting device 50. That is, the lower relay devices 41 and 42 are configured to perform a transfer service of transferring to the upper relay device 70 (upper setting device 80) a cooperation request (broker information) from the lower node (terminal nodes 31, 32, 33, and 34).

With regard to the upper setting device 80, the upper partition information update unit 804 requests the upper authentication server 90 to distribute an upper session key, before sending the upper partition information to the upper relay device 70. The upper partition information update unit 804 encrypts the partition information with the upper session key distributed from the upper authentication server 90 and sends the encrypted partition information to the upper relay device 70. In other words, the upper partition information update unit 804 is configured to update the upper partition information stored in the upper partition information storage unit 702 after the upper authentication server 90 distributes the upper session key.

In the modification, after the terminal node 30 transmits the broker information, the broker information is received by the lower setting device 51 or 52 first. Thereafter, the broker information is sent to the upper relay device 70 via the lower relay device 41 or 42.

The following explanation is made to operation of the communication network system in accordance with the modification of the present embodiment.

When the first terminal node 31 requests the cooperation between the first terminal node 31 and the third terminal node 33, the first terminal node 31 sends the broker information (C11, X1, C21) to the lower setting device 51 ((1) in FIG. 4). The lower broker information storage unit 512 stores the broker information shown in table 10. The lower partition information update unit 514 requests the lower authentication server 61 to distribute the lower session key ((2) in FIG. 4). Subsequently, the lower partition information update unit 504 encrypts the broker information with the lower session key distributed from the lower authentication server 61 and sends the encrypted broker information to the upper relay device 70 (upper setting device 80) ((3) in FIG. 4). The upper relay device 70 sends the broker information received from the lower relay device 41 to the upper setting device 80.

TABLE 10

| source node ID | domain ID | request node ID |
| --- | --- | --- |
| C11 | X1 | C21 |

When the third terminal node 33 requests the cooperation between the first terminal node 31 and the third terminal node 33, the third terminal node 33 sends the broker information (C21, X1, C11) to the lower setting device 52 ((4) in FIG. 4). The lower broker information storage unit 522 stores the broker information shown in table 11. The lower partition information update unit 524 requests the lower authentication server 62 to distribute the lower session key ((5) in FIG. 4). Subsequently, the lower partition information update unit 524 encrypts the broker information with the lower session key distributed from the lower authentication server 62 and sends the encrypted broker information to the upper relay device 70 (upper setting device 80) ((6) in FIG. 4). The upper relay device 70 sends the broker information received from the lower relay device 41 to the upper setting device 80.

TABLE 11

| source node ID | domain ID | request node ID |
| --- | --- | --- |
| C21 | X2 | C11 |

With regard to the upper setting device 80, the upper communication unit 801 receives the broker information from the lower setting devices 51 and 52 by way of the lower relay devices 41 and 42, respectively. Thus, the upper broker information storage unit 802 collects cooperation request data (broker information), and stores the broker information shown in table 8. Thereafter, as described in the above, the upper setting device 80 updates the upper partition information of the upper key storage unit 902 and the upper partition information storage unit 702 ((7) in FIG. 4). Consequently, the communication between the first terminal node 31 and the third terminal node 33 is permitted. In other words, the communication between the different lower domains 21 and 22 is allowed.

According to this modification, each terminal node 30 is required to be given only a network address for enjoyment of the transfer service provided by the lower relay device 41 or 42. With this configuration, it is possible to make registration of the addresses only distinctive from each other within the lower domains. In other words, configuration management can be made with respect to each one of the domains 21 and 22 for easy configuration. For example, even in a situation where an NAT router is employed to allocate individual addresses such as private addresses respectively to the lower domains 21 and 22, the lower domains only require easy configuration management with the use of a fixed network address as a default one for utilization of the transfer service.

Besides, in the modification, the partition information update units 804 and 504 request the authentication servers 90 and 60 to distribute the session key, respectively. Alternatively, the partition information update units 804 and 504 may wait for redistribution of the session key from the authentication servers 90 and 60, respectively. In brief, the partition information update units 804 and 504 may be configured to send at least one of the partition information and the broker information after the authentication servers 90 and 60 distribute the session key, respectively.

As shown in FIG. 5, the broker information may include attribute information. The attribute information is defined as information indicative of whether the cooperation is made with the domain or with the single terminal node 30. For example, the attribute information includes "ALL" and "ONLY". The "ALL" indicates permitting the cooperation with the domain 20, that is, the terminal nodes 30 included in the lower domain 20. The "ONLY" indicates permitting the cooperation with the designated terminal node 30.

When the broker information includes the attribute information of "ALL", the communication network system operates in a similar manner as mentioned above. Meanwhile, when the broker information includes the attribute information of "ONLY", the lower setting device 51 changes the partition information stored in the lower partition information storage unit 412 from the contents shown in table 1 to the contents shown in table 12, for example. Further, the lower setting device 51 changes the partition information stored in the lower key storage unit 612 from the contents shown in table 5 to the contents shown in table 13, for example. Similarly, the lower setting device 52 changes the partition information stored in the lower partition information storage unit 422 from the contents shown in table 2 to the contents shown in table 14, for example. Further, the lower setting device 52 changes the partition information stored in the lower key storage unit 622 from the contents shown in table 6 to the contents shown in table 15, for example.

TABLE 12

| node ID | partition number |
|---|---|
| A0 | 1 |
| B1 | 1.1 |
| C11 | 1.1.1 |
| C12 | 1.2 |
| Y1 | 1.1 |

TABLE 13

| node ID or domain ID | secret key | partition number |
|---|---|---|
| B1 | Kb1 | 1.1 |
| C11 | Kc11 | 1.1.1 |
| C12 | Kc12 | 1.2 |

TABLE 14

| node ID | partition number |
|---|---|
| A0 | 1 |
| B2 | 1.2 |
| C21 | 1.2.1 |
| C22 | 1.1 |
| Y12 | 1.2 |

TABLE 15

| node ID or domain ID | secret key | partition number |
|---|---|---|
| B2 | Kb2 | 1.2 |
| C21 | Kc21 | 1.2.1 |
| C22 | Kc22 | 1.1 |

In the partition information shown in each of tables 12 and 13, the first terminal node 31 has the partition number of "1.1.1", and the second terminal node 32 has the partition number of "1.2". The lower routing unit 413 permits the communication between the first terminal node 31 and the lower relay device 41 in accordance with the rule 2. However, the lower routing unit 413 does not permit the communication between the second terminal node 32 and the lower relay device 41.

In the partition information shown in each of tables 14 and 15, the third terminal node 33 has the partition number of "1.2.1", and the fourth terminal node 34 has the partition number of "1.2". The lower routing unit 423 permits the communication between the third terminal node 33 and the lower relay device 42 in accordance with the rule 2. However, the lower routing unit 423 does not permit the communication between the fourth terminal node 34 and the lower relay device 42.

With this arrangement, each of the domains 10, 21, and 22 has the partition information. Therefore, the access control between the nodes can be managed at multiple sites. Consequently, it is possible to improve the security of the communication between the nodes.

Further, it is possible to determine permission or prohibition of the communication for each node in each of the domains 10, 21, and 22. Accordingly, when the terminal nodes 30 which belong to the different domains 21 and 22 are requested to cooperate with each other, only the requested terminal nodes 30 are permitted to communicate with each other. It is possible to improve the security of the communication.

Second Embodiment

According to the communication network system of the present embodiment, the partition information (lower partition information and upper partition information) includes the identification number (node ID) of the node belonging to the lower domain 20 together with a local partition number and a global partition number respectively associated with the identification number, The local partition number is used for judging whether or not relaying between the nodes belonging to the same lower domain is allowed. In brief, the local partition number is defined as the partition number used in the domain. In other words, the local partition number is valid only within the particular lower domain.

The global partition number is used for judging whether or not relaying between the nodes belonging to the different domains is allowed. In brief, the global partition number is defined as the partition number used among the domains. In other words, the global partition number is valid within the entire communication network.

According to the present embodiment, a region is provided in each of the partition information storage units 702, 412, and 422 and the key storage units 902, 612, and 622 for separately storing the local partition number and the global partition number as being distinctive from each other.

In the following, in order to distinguish between the local partition number and the global partition number, a prefix letter "L:" is added to the beginning of the local partition number and a prefix letter "G:" is added to the beginning of the global partition number.

In the present embodiment, the routing units 703, 413, and 423 perform the control (access control) of the relay units 701, 411, and 412 in conformity with the following rules, respectively.

Rule 1: when the nodes in the same domain have the same local partition number, these nodes are permitted to communicate with each other.

Rule 2: when the local partition number is found to indicate the partition number of the lower domain of "0" (i.e., the digit of "0" on the right side of "."), it is permitted to transmission between the nodes in the same domain having the same partition number indicative of the upper domain.

Rule 3: when the nodes in the different domains have the same global partition number, these nodes are permitted to communicate with each other.

Rule 4: when the global partition number is found to indicate the partition number of the lower domain of "0" (i.e., the digit of "0" on the right side of "."), it is permitted to transmission between the nodes in the different domains having the same partition number indicative of the upper domain.

In the rules 2 and 4, the digit of "0" on the right side of "." indicates a wild card which is regarded as identical to any digit on the right side of ".". In addition, "0.0" is not expressed. For example, "1.0" is abbreviated to "1".

Accordingly, when the nodes have the same local partition number, these nodes are permitted to communicate with each other only within the same domain (e.g., domains 10, 21, and 22). When the nodes have the same global partition number, these nodes are permitted to communicate with each other over the domains 10, 21, and 22. The local partition number and the global partition number are given to each node. Consequently, one of the nodes can be permitted to communicate or prohibited from communicating with another node within the same domain 10, 21, or 22, and the other can be permitted to communicate or prohibited from communicating with another node without regard to the domains 10, 21, and 22. In brief, it is possible to freely determine a permitted communication range and prohibited communication range for each node included in the communication network system.

In the present embodiment, the partition information storage units 702, 412, and 422 store the partition information shown in tables 16, 17, and 18, respectively.

TABLE 16

| node ID | partition number |
|---------|------------------|
| A0 | G: 1 L: 2 |
| Y0 | G: 1 L: 2 |
| B1 | G: 1.2 L: 2 |
| B2 | G: 1.2 L: 2.2 |

TABLE 17

| node ID | partition number |
|---------|------------------|
| A0 | G: 1 L: 2 |
| B1 | G: 1.1 L: 2.1 |
| C11 | G: 1.1 L: 2.1 |
| C12 | G: 1.1 L: 2.1 |

TABLE 18

| node ID | partition number |
|---------|------------------|
| A0 | G: 1 L: 2 |
| B2 | G: 1.2 L: 2.2 |
| C21 | G: 1.2 L: 2.2 |
| C22 | G: 1.2 L: 2.2 |

The key storage units 902, 612, and 622 store the partition information shown in tables 19, 20, and 21, respectively.

TABLE 19

| node ID or domain ID | secret key | partition number |
|----------------------|------------|------------------|
| A0 | Ka0 | G: 1 L: 2 |
| X1 | Kdx1 | G: 1.1 L: 2.1 |
| X2 | Kdx2 | G: 1.2 L: 2.2 |
| Y0 | Ky0 | G: 1 L: 2 |

TABLE 20

| node ID or domain ID | secret key | partition number |
|----------------------|------------|------------------|
| B1 | Kb1 | G: 1.1 L: 2.1 |
| C11 | Kc11 | G: 1.1 L: 2.1 |
| C12 | Kc12 | G: 1.1 L: 2.1 |

TABLE 21

| node ID or domain ID | secret key | partition number |
|----------------------|------------|------------------|
| B2 | Kb2 | G: 1.2 L: 2.2 |
| C21 | Kc21 | G: 1.2 L: 2.2 |
| C22 | Kc22 | G: 1.2 L: 2.2 |

The relay devices 70, 41, and 42 permit the communication between the nodes which have the same local partition number and the communication between the nodes which have the same global partition number in conformity with the aforementioned rules. According to the configuration of the present embodiment, the partition number is considered to be multiplexed.

The following explanation is made to operation of the communication network of the present embodiment. The lower relay device 41 has the lower partition information storage unit 412 which stores the partition information shown in table 17, and the lower authentication server 61 has the lower key storage unit 612 which stores the partition information shown in table 20. Therefore, the first terminal node 31 is permitted to communicate to the nodes (the lower setting device 41 and the second terminal node 32) included in the lower domain 21. Moreover, the first terminal node 31 is permitted to communicate to the node (the upper relay device 70) in an outside of the lower domain 21. Similarly, the second terminal node 32 is permitted to communicate to the nodes (the lower setting device 41 and the first terminal node 31) included in the lower domain 21. Moreover, the second terminal node 32 is permitted to communicate to the node (the upper relay device 70) in the outside of the lower domain 21.

In order to prohibit the communication between the second terminal node 32 and the node in the domain other than the lower domain 21, the global partition number of the second terminal node 32 is changed from "G: 1.1" to "G: 1.2". In this instance, the second terminal node 32 is permitted to communicate to the node which is included in the lower domain 21 and has the same local partition number as the second terminal node. Meanwhile, the second terminal node 32 has the different partition number from the lower relay device 41. Therefore, the lower relay device 41 prohibits the second terminal node 32 from communicating to the node outside the lower domain 21. For example, when each of the terminal nodes 31 and 32 includes a TV camera, an image created by the terminal node 31 is transmitted to the node in the outside of the lower domain 21, but an image created by the terminal node 32 is not transmitted to the node in the outside of the lower domain 21. All the user has to do for changing the configuration of the node is to modify the partition information (partition number) stored in the partition information storage unit (e.g., the partition information storage units 702, 412, and 422) of the domain (e.g., the domains 10, 21, 22) including the node that the user wants to change the configuration.

Accordingly, the communication network system of the present embodiment can perform both the access control of the nodes belonging to the same domain (e.g., the domains 10, 21, and 22) and the access control of the nodes belonging to the different domains (e.g., the domains 10, 21, and 22). For example, it is possible to permit the communication between the terminal nodes 31 and 32 belonging to the same domain 21 and the communication between the terminal nodes 33 and 34 belonging to the different domains 21 and 22. Besides, the other configuration and operation of the communication network of the present embodiment are same as those of the communication network of the first embodiment, and no explanations thereof are deemed necessary.

The partition information may include at least one of various partition numbers such as a management partition number. With attaching the various partition numbers to each node, it is possible to determine whether or not the communication is allowed based on various conditions. For example, it is possible to flexibly modify a range of application of a service such as update of firmware and cooperation with a particular service.

Third Embodiment

The communication network system of the present embodiment is different from the communication network system of the first embodiment in the configuration of the partition information.

In the present embodiment, the lower setting devices 41 and 42 are configured to communicate with the upper relay device 70. The relay devices 40 and 70 perform content-based data routing so as to perform the access control of the nodes. In order to perform the content-based data routing, each terminal node 30 is configured to store an object identifier for uniquely identifying a service (object) provided by the terminal node 30. Further, each terminal node 30 is configured to store an interface identifier for uniquely identifying a service attribute (interface) of the object.

The following explanation is made to an operation instance of the communication network system of the present embodiment.

When the first terminal node 31 provides the particular object (the image generated by the TV camera) to the third terminal node 31 belonging to the lower domain 22 different from the lower domain 21 to which the first terminal node 31 belongs, the first terminal node 31 publishes the object identifier associated with the particular object to an external network. In order to publish the object identifier, the first terminal node 31 sends a provision message together with the object identifier to the relay device 70. Upon receiving the provision message from the first terminal node 31, the relay device 70 publishes the received object identifier such that a third person can recognize the object identifier. Besides, only the object identifier is disclosed. Therefore, the image generated by the TV camera is not transferred, and therefore the third person cannot see the image.

The third terminal node 33 accesses the relay device 70 in order to enjoy the particular service provided by the first terminal node 31. Consequently, the third terminal node 33 obtains the identifier of the particular service of transferring the image. That is, the third terminal node 33 obtains the object identifier and the identifier of the first terminal node 31 providing the particular service. Thus, the third terminal node 33 enjoys the particular service provided by the first terminal node 31 by way of the relay device 70.

The partition information of the present embodiment includes the object identifier for identifying the object, and the interface identifier for identifying the interface.

For example, the partition information of the present embodiment includes the object identifier of the terminal node 30 (source node) providing the service, and the interface identifier of the terminal node 30 (destination node) enjoying the service, in addition to the partition number.

The present embodiment enables the partition information storage unit 702 to describe the partition with various combinations of the object identifier defined at the terminal node 30 and the interface identifier. With this arrangement, it is possible to reduce the number of information combinations stored in the partition information storage unit 702, and also to give flexibility to information stored in the partition information storage unit 702.

Each of the nodes (the relay devices 40, 41, and 70 and the terminal nodes 31, 32, 33, and 34) constituting the communication network system of the present embodiment may have at least one of the objects. Further, the single object may include plural interfaces. Therefore, with using the object identifier and the interface identifier as the partition information, it is possible to request various kinds of the service attributes with regard to various kinds of the functions by use of the single identification information (the node ID, or the domain ID). In other words, the communication network system does not require two or more addresses in order to provide the plural services.

For example, when the protocol employed by the communication network system of the present embodiment is the TCP/IP, it is possible to provide the plural services only with less number of connections. Further, the node which receives the service can access the plural objects only with less number of connections. Therefore, for example, it is possible to flexibly change the received service by selecting the desired object from the plural objects which the node has.

In the present embodiment, the object identifier is expressed as "OID", and the interface identifier is expressed as "IID". In order to distinguish between the object identifiers OID, a positive integer is added to the object identifier OID, if necessary. In order to distinguish between the interface identifiers IID, a positive integer is added to the interface identifier IID, if necessary.

For example, a statement of OID1:IID1, OID1:IID2, etc is used to associate the single object identifier OID1 with the multiple interface identifiers IID1, IID2, . . . , etc. A statement of OID1:IID1, OID2:IID1, etc is used to associate the single interface identifier IID1 with the multiple object identifiers OID1, OID2, . . . , etc.

For example, the object identifier OID1 is corresponding to the object which is the program defining a camera. The interface identifier IID1 is corresponding to a zoom-function. The interface identifier IID2 is corresponding to a pan-function.

A wild card can be used for associating the object identifier with the interface identifier. In the present embodiment, the wild card is expressed as "*". For example, a statement of "OID1:*" or ":IID1" is available. The statement of "OID1:*" means associating the object identifier OID1 with any interface identifier. The statement of "*:IID1" means associating the interface identifier IID1 with any object identifier.

Using the various combinations as mentioned in the above enables to associate the interface identifier (e.g., IID1, and IID2) with the object identifier (e.g., OID1). Thus, the cooperation relations designated by the statements of "OID1:IID1" and "OID1:IID2" can be set, respectively. The node having the corresponding object identifier can cooperate with the node having the corresponding interface identifier. In other words, with using the object identifier and the interface identifier in proper combination, it is possible to simplify configuration of the cooperation relation and to improve the flexibility of the cooperation relation. The other configuration and operation of the communication network system of the present embodiment are same as those of the communication network system of the first embodiment, and no explanations thereof are deemed necessary.

Fourth Embodiment

According to the communication network system of the present embodiment, the partition number is described by a combination of a network address and a subnet mask. The identification information (node ID) of each node (the relay devices 70, 41, and 42, the setting device 80, 51, and 52, and the terminal nodes 31, 32, 33, and 34) is defined as a MAC address used in the corresponding domain (the domains 10, 21, and 22).

The upper setting device 70 has a function of providing the network address and the subnet mask in response to a request from the node in the upper domain 10. The lower setting device 41 has a function of providing the network address and the subnet mask in response to a request from the node in the lower domain 21. The lower setting device 42 has a function of providing the network address and the subnet mask in response to a request from the node in the lower domain 22. When the node belonging to each of the domains 10, 21, and 22 requests the corresponding relay device (relay devices 70, 41, and 42) to provide the network address and the subnet mask as well as requests the cooperation with another node. In other words, the relay devices 70, 41, and 42 have the same function as a router having a DHCP function. However, differently from the router, the relay devices 70, 41, and 42 can dynamically switch between permission and prohibition of the communication between the nodes on the basis of the partition information.

Like the second embodiment, the partition information of the present embodiment includes the local partition number and the global partition number. In the present embodiment, the private address is used as the local partition number and the global address is used as the global partition number.

In the present embodiment, the partition information storage units 702, 412, and 422 store the partition information shown in tables 22, 23, and 24, respectively.

TABLE 22

| node ID | partition number |
|---------|------------------|
| A0 | G: 1.0.0.0/24 |
| Y0 | G: 1.0.0.0/24 |
| B1 | G: 1.0.1.0/24 L: 172.16.1.0/24 |
| B2 | G: 1.0.2.0/24 L: 172.16.2.0/24 |

TABLE 23

| node ID | partition number |
|---------|------------------|
| A0 | G: 1.0.1.0/24 |
| B1 | G: 1.0.1.0/24 L: 172.16.1.0/24 |
| C11 | G: 1.0.1.0/24 L: 172.16.1.0/24 |
| C12 | G: 1.0.1.0/24 L: 172.16.1.0/24 |

TABLE 24

| node ID | partition number |
|---------|------------------|
| A0 | G: 1.0.2.0/24 |
| B2 | G: 1.0.1.0/24 L: 172.16.2.0/24 |
| C21 | G: 1.0.1.0/24 L: 172.16.2.0/24 |
| C22 | G: 1.0.1.0/24 L: 172.16.2.0/24 |

Further, the key storage units 902, 612, and 622 store the partition information shown in tables 25, 26, and 27, respectively.

TABLE 25

| node ID | secret key | partition number |
|---------|------------|------------------|
| A0 | Ka0 | G: 1.0.0.0/24 |
| X1 | Kdx1 | G: 1.0.1.0/24 L: 172.16.1.0/24 |
| X2 | Kdx2 | G: 1.0.2.0/24 L: 172.16.1.0/24 |
| Y0 | Ky0 | G: 1.0.0.0/24 |

TABLE 26

| node ID | secret key | partition number |
|---------|------------|------------------|
| B1 | Kb1 | G: 1.0.1.0/24 L: 172.16.1.0/24 |
| C11 | Kc11 | G: 1.0.1.0/24 L: 172.16.1.0/24 |
| C12 | Kc12 | G: 1.0.1.0/24 L: 172.16.1.0/24 |

TABLE 27

| node ID | secret key | partition number |
|---------|------------|------------------|
| B2 | Kb2 | G: 1.0.2.0/24 L: 172.16.2.0/24 |
| C21 | Kc21 | G: 1.0.2.0/24 L: 172.16.2.0/24 |
| C22 | Kc22 | G: 1.0.2.1/24 L: 172.16.2.0/24 |

In the present embodiment, the relay devices 70, 41, and 42 provides IP addresses (IPv4 or IPv6) to the setting devices 80, 51, and 52, respectively. Further, the relay devices 70, 41, and 42 store the IP addresses given to the setting devices 80, 51, and 52, respectively. If each of the setting devices 80, 51, and 52 is a node for PPPoE, the upper relay device 70 is configured to give addresses to each of the setting devices 80, 51, and 52.

In the present embodiment, the upper setting device 70 has a function of a router. Further, each of the lower setting devices 41 and 42 has a function of a NAT router (router having a NAT function).

The lower setting device 40 has a private address (private network address and subnet mask) and a global address (global network address and subnet mask). For example, the lower setting device 41 has the private address of "172.16.1.0/24", and the lower setting device 42 has the private address of "172.16.2.0/24". The lower setting device 41 has the global address of "1.0.1.0/24", and the lower setting device 42 has the global address of "1.0.2.0/24".

When the first terminal node 31 requests the cooperation with the third terminal node 33, the first terminal node 31 sends the broker information to the lower setting device 51. The node ID included in this broker information is the MAC address. Similarly, when the third terminal node 33 requests the cooperation with the first terminal node 31, the third terminal node 33 sends the broker information to the lower setting device 52. That is, the terminal node 30 sends the cooperation request together with the MAC address used as the node ID.

The lower setting devices 51 and 52 obtain the network address and subnet mask based on the internet protocol corresponding to the node ID of the terminal nodes 31 and 33 from the partition information storage units 412 and 422 (or the key storage units 612 and 622) by means of the DHCP function, respectively. Accordingly, the lower setting device 51 generates the IP address and allocates it to the terminal node 31, and the lower setting device 52 generates the IP address and allocates it to the terminal node 33. That is, in the communication network system of the present embodiment, the lower setting device 50 establishes two-way communication with the terminal node 30. In contrast, in the communication network system, the lower setting device 50 can receive a signal from the terminal node 30 but cannot send a signal to the terminal node 30.

The lower setting device 50 performs processing of allocating the IP address to the terminal node 30 and processing of responding to the cooperation request from the terminal node 30 simultaneously. When the request node ID of the broker information indicates the node ID corresponding to the node which belongs to the same domain 20 as the node indicated by the source ID of the same broker information, the lower setting device 50 updates the partition information of the lower partition information storage unit 402 and the lower key storage unit 602. When the terminal node 30 which requests the cooperation is reconnected, the key storage unit 602 is updated and the key distribution unit 601 distributes the session key. That is, the update of the partition information accompanies the distribution of the session key. The partition information storage unit 402 is uses as a routing table for the NAT router.

When the request node ID of the broker information indicates the node ID corresponding to the node belonging to the different domain 20 from the domain indicated by the source node ID of the same broker information, the lower setting device 50 sends the broker information to the upper setting device 80 by way of the lower relay device 40. The upper setting device 80 updates the partition information of the upper partition information storage unit 702 and the upper key storage unit 902 on the basis of the received broker information. That is, the upper key storage unit 902 cooperates with the upper partition information storage unit 702 defined as a routing table of the upper domain 10. When the terminal node 30 which requests the cooperation is reconnected, the update of the key storage unit 902 is performed together with the distribution of the session key performed by the key distribution unit 601.

The communication network system of the present embodiment adopts the global address as the global partition number, and adopts the private address as the local partition number. Therefore, the partition number is corresponding to the IP address including the global address and the private address based on the NAT function. Therefore, the lower relay device 40 determines whether or not it performs the NAT function on the basis of the cooperation request (broker information).

When the terminal node 30 requests the cooperation with the other terminal node 30 belonging to the different domain 20, the lower relay device 40 performs the NAT function. In this instance, the lower relay device 40 creates a conversion table used in the NAT function. In contrast, when the terminal 30 requests the cooperation with the other terminal node 30 belonging to the same domain 20, the lower relay device 40 does not perform the NAT function. In this instance, the lower relay device 40 does not creates the conversion table used in the NAT function. The lower relay device 40 performs the DHCP server function to obtain the IP address, at the time of reconnection of the terminal node 30 which requests the cooperation. The lower relay device 40 creates the conversion table used in the NAT function by use of the partition number of the terminal node 30 and the IP address (address value) obtained by performing the DHCP server function.

As described in the above, in the communication network system of the present embodiment, the partition number is identical to the address used for performing routing. Therefore, decision of whether or not the communication is permitted, in other words, the access control can be made for each node. Further, the partition number is corresponding to the IP address including the private address based on the NAT function. Therefore, it is possible to make the configuration of the access control and traversal of the NAT function simultaneously. In brief, in order to prohibit the communication between the different domains, the traversal of the NAT function is prohibited by allocating no global address. It is possible to make configuration flexibly in response to the cooperation request.

Besides, the upper relay device 70 may be realized by use of a router. The lower relay devices 41 and 42 may be realized by use of a LAN switch having a switching function of a layer 3 (L3) in the internet protocol. The network address and subnet mask for each of the relay devices 41 and 42 are set in a similar manner as the aforementioned instance. The IP address for each of the relay devices 41 and 42 may be an IP address of IPv4, or an IP address of IPv6. An address realm using mask processing in a similar manner as the IPv4 or IPv6 can be available for the present embodiment. Further, address assignment may be made by utilizing auto IP, UPnP, a link local address of the IPV6, and a PPPoE function, rather than the DHCP server. The communication network of the present embodiment is the same in the other configurations and operation as the communication network system of the second embodiment, and no explanations thereof are deemed necessary.

The invention claimed is:

1. A communication network system comprising:
   plural nodes;
   a relay device interposed between said nodes; and
   a setting device connected to said relay device,
   wherein said relay device comprises:
      a relay unit configured to relay between said nodes;
      a partition information storage unit configured to store partition information for indicating whether or not said relay unit relays between said nodes; and
      a routing unit configured to control said relay unit in accordance with the partition information stored in said partition information storage unit, and
   wherein said setting device comprises:
      a reception unit configured to receive broker information indicative of a request of relaying between said nodes;
      a broker information storage unit configured to store the broker information received by said reception unit;
      a broker information setting unit configured to generate the partition information based on the broker information stored in said broker information storage unit; and
      a partition information update unit configured to update the partition information stored in said partition information storage unit of said relay device to the partition information generated by said broker information setting unit.

2. The communication network system as set forth in claim 1, wherein
   the broker information includes information indicative of a source and information indicative of a destination,
   said source being defined as said node which requests said relay device to relay a signal, and
   said destination being defined as said node which said source requests to receive the signal,
   said broker information setting unit comprising:
      a broker information judgment module configured to, when said broker information storage unit stores two pieces of the broker information including first broker information and second broker information, judge whether or not the source and the destination indicated by the first broker information are identical to the destination and the source indicated by the second broker information respectively; and
      a partition information generation module configured to generate the partition information for making said relay device relay between the source indicated by the first broker information and the destination indicated by the first broker information when said broker information judgment module determines that the source and the destination indicated by the first broker information are identical to the destination and the source indicated by the second broker information respectively.

3. The communication network system as set forth in claim 1, wherein
   each of said nodes includes an object defined as a group of interfaces each being a program for realizing a desired function, the partition information including an object identifier for identifying the object, and an interface identifier for identifying the interface.

4. A communication network system comprising:

an upper domain including plural lower domains, wherein each of said lower domains comprises plural nodes and a lower relay device interposed between said nodes, said lower relay device comprising:
a lower relay unit configured to relay between said nodes;
a lower partition information storage unit configured to store lower partition information for indicating whether or not said lower relay unit relays between said nodes; and
a lower routing unit configured to control said lower relay unit in accordance with the lower partition information stored in said lower partition information storage unit, and
wherein said upper domain further comprises an upper relay device interposed between said lower relay devices belonging to said different lower domains, and an upper setting device connected to said upper relay device, said upper relay device comprising:
an upper relay unit configured to relay between said lower relay units;
an upper partition information storage unit configured to store upper partition information for indicating whether or not said upper relay unit relays between said lower relay units; and
an upper routing unit configured to control said upper relay unit in accordance with the upper partition information stored in said upper partition information storage unit, and said upper setting device comprising:
an upper reception unit configured to receive upper broker information indicative of a request of relaying between said lower relay units;
an upper broker information storage unit configured to store the upper broker information received by said upper reception unit;
an upper broker information setting unit configured to generate the upper partition information based on the upper broker information stored in said upper broker information storage unit; and
an upper partition information update unit configured to update the upper partition information stored in said upper partition information storage unit to the upper partition information generated by said upper broker information setting unit.

5. The communication network system as set forth in claim 4, wherein each of said lower domains further comprises a lower setting device connected to its lower relay device, said lower setting device comprising:
a lower reception unit configured to receive lower broker information indicative of a request of relaying between said nodes;
a lower broker information storage unit configured to store the lower broker information received by said lower reception unit;
a lower broker information setting unit configured to generate the lower partition information based on the lower broker information stored in said lower broker information storage unit; and
a lower partition information update unit configured to update the lower partition information stored in said lower partition information storage unit to the lower partition information generated by said lower broker information setting unit.

6. The communication network system as set forth in claim 4, wherein said lower domain further comprises a lower authentication server configured to distribute a lower session key used for communication within the same lower domain, said upper domain further comprising an upper authentication server configured to distribute an upper session key used for communication within the same upper domain, and said upper partition information update unit being configured to update the upper partition information stored in said upper partition information storage unit after said lower authentication server and said upper authentication server distribute the lower session key and the upper session key respectively.

7. The communication network system as set forth in claim 5, wherein said lower domain further comprises a lower authentication server configured to distribute a lower session key used for communication within the same lower domain, said upper domain further comprising an upper authentication server configured to distribute an upper session key used for communication within the same upper domain, said upper partition information update unit being configured to update the upper partition information stored in said upper partition information storage unit after said upper authentication server distributes the upper session key, and said lower partition information update unit being configured to update the lower partition information stored in said lower partition information storage unit after said lower authentication server distributes the lower session key.

8. The communication network system as set forth in claim 7, wherein the lower partition information includes an identification number of said node belonging to said lower domain together with a local partition number and a global partition number respectively associated with the identification number, the local partition number being used for judging whether or not relaying between said nodes belonging to the same lower domain is allowed, and the global partition number being used for judging whether or not relaying between said nodes belonging to the different domains is allowed.

9. The communication network system as set forth in claim 1, wherein the partition information includes an identification number of said node, and a partition number associated with the identification number, said routing unit being configured to control said relay unit in a manner to relay between said nodes which have the same partition number, and the partition number being determined by use of both a network address and a subnet mask which are provided to said node.

10. The communication network system as set forth in claim 5, wherein said lower domain further comprises a lower authentication server configured to distribute a lower session key used for communication within the same lower domain, said upper domain further comprising an upper authentication server configured to distribute an upper session key used for communication within the same upper domain, and said upper partition information update unit being configured to update the upper partition information stored in said upper partition information storage unit after said lower authentication server and said upper authentication server distribute the lower session key and the upper session key respectively.

* * * * *